US012789525B2

United States Patent

Miura et al.

(10) Patent No.: US 12,789,525 B2
(45) Date of Patent: Nov. 10, 2026

(54) PRINTING HEAD SUBSTRATE

(71) Applicant: CANON KABUSHIKI KAISHA, Tokyo (JP)

(72) Inventors: Yosuke Miura, Tokyo (JP); Nobuyuki Hirayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 18/631,298

(22) Filed: Apr. 10, 2024

(65) Prior Publication Data

US 2024/0375398 A1 Nov. 14, 2024

(30) Foreign Application Priority Data

May 9, 2023 (JP) ................................ 2023-077139

(51) Int. Cl.
*B41J 2/14* (2006.01)

(52) U.S. Cl.
CPC ....... *B41J 2/14072* (2013.01); *B41J 2/14129* (2013.01); *B41J 2002/14491* (2013.01); *B41J 2202/18* (2013.01)

(58) Field of Classification Search
CPC ................ B41J 2/14072; B41J 2/14129; B41J 2002/14491; B41J 2202/18
See application file for complete search history.

(56) References Cited

U.S. PATENT DOCUMENTS

| | | | | |
|---|---|---|---|---|
| 10,035,346 | B2 | 7/2018 | Kasai et al. | |
| 10,322,581 | B2 | 6/2019 | Hirayama | |
| 10,814,623 | B2 | 10/2020 | Kasai et al. | |
| 2010/0149281 | A1* | 6/2010 | Tamaru | B41J 2/14072 347/63 |
| 2019/0001677 | A1* | 1/2019 | Kasai | B41J 2/0458 |

FOREIGN PATENT DOCUMENTS

JP 2017-213874 A 12/2017

* cited by examiner

*Primary Examiner* — Geoffrey S Mruk
(74) *Attorney, Agent, or Firm* — VENABLE LLP

(57) ABSTRACT

A printing head substrate includes: a heating element configured to control a temperature of the printing head substrate that ejects liquid supplied from a liquid supply port from an ejection orifice; and a driver configured to drive the heating element. An electrical connection between the heating element and the driver is made by plural pieces of wiring.

10 Claims, 13 Drawing Sheets

PRINTING HEAD SUBSTRATE

BACKGROUND OF THE INVENTION

Field of the Invention

The present disclosure relates to a printing head substrate that drives a printing element that performs printing by ejecting liquid.

Description of the Related Art

In an ink jet printing apparatus, a printing head substrate that drives a printing element that performs printing by ejecting liquid controls a temperature of the substrate to satisfy the demand for the enhanced image quality. In the printing head substrate, an ejected liquid droplet amount and an ejection velocity of the liquid are varied depending on the temperature. Therefore, in a case where there is a temperature distribution of the substrate temperature, the density of an image becomes uneven depending on the temperature distribution of the substrate temperature, and the image quality is deteriorated. As a method of correcting the temperature distribution of the printing head substrate, Japanese Patent Laid-Open No. 2017-213874 (hereinafter, referred to as PTL 1) discloses the following method. PTL 1 discloses a method of suppressing the temperature distribution in the printing head substrate by mounting a driver of a sub heater in each of specific areas in the printing head substrate, voluntarily selecting plural areas from the specific areas, and heating the plural selected areas.

SUMMARY OF THE INVENTION

A printing head substrate according to the present disclosure includes: a heating element configured to control a temperature of the printing head substrate that ejects liquid supplied from a liquid supply port from an ejection orifice; and a driver configured to drive the heating element, in which an electrical connection between the heating element and the driver is made by plural pieces of wiring.

Further features of the present disclosure will become apparent from the following description of exemplary embodiments with reference to the attached drawings.

DESCRIPTION OF THE EMBODIMENTS

Figure 1:
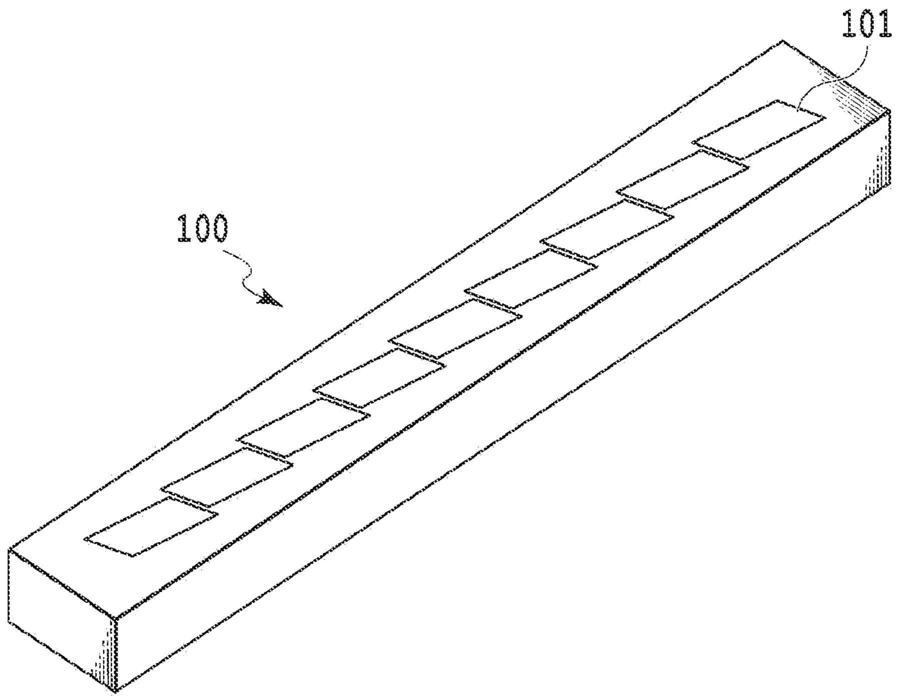
FIG. 1 is a schematic configuration diagram of a liquid ejection head.
Figure 2A:
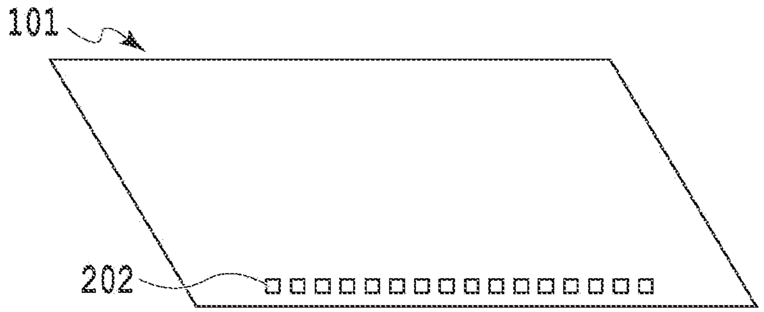
FIGS. 2A, 2B, 2C, and 2D are diagrams each illustrating a shape of a printing head substrate.
Figure 2B:
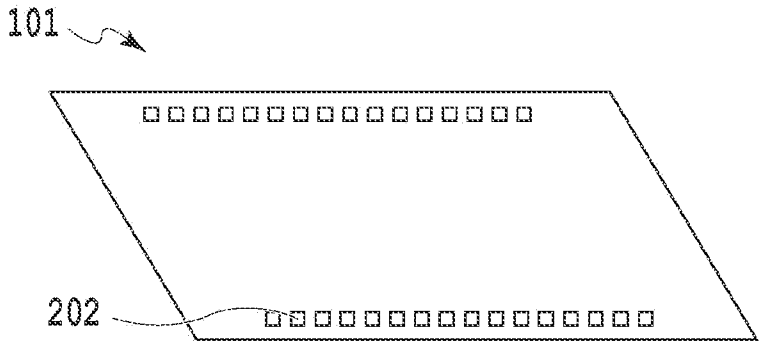
Figure 2C:
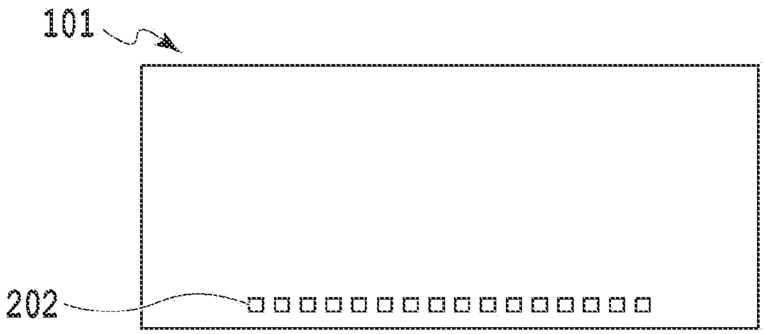
Figure 2D:
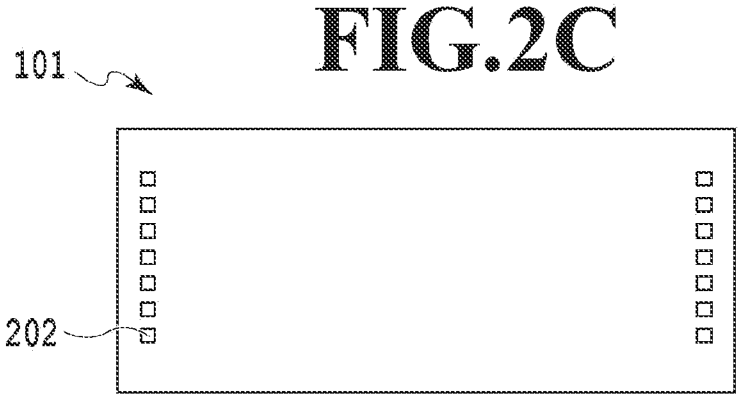

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans. Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

First Embodiment

A first embodiment of a printing head substrate of a liquid ejection head according to the present disclosure is described below with reference to the appended drawings. FIG. 1 is a schematic configuration diagram of a liquid ejection head 100 according to the present disclosure. In the liquid ejection head 100, plural printing head substrates 101 are arranged in a row, and the liquid ejection head 100 generally has a form called a line head. Representative shapes of the printing head substrate 101 are the shapes illustrated in FIGS. 2A to 2D. A PAD 202 including a signal terminal and a power supply terminal is also arranged in various forms on the printing head substrate 101. The shape of the printing head substrate 101 is not limited thereto and may be trapezoidal (not illustrated) or the like, for example.

Figure 3:
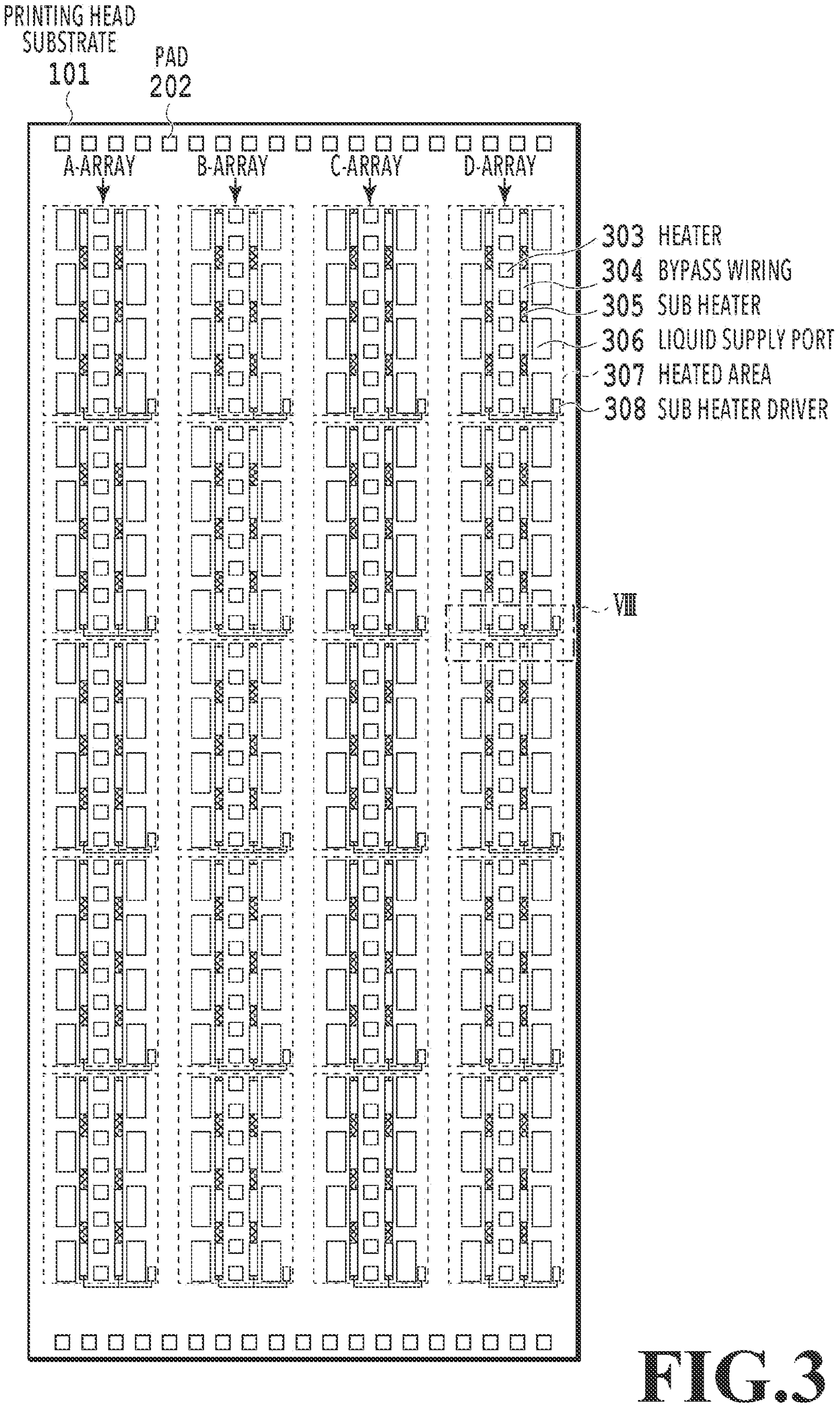
FIG. 3 is a diagram illustrating a layout of the printing head substrate.

FIG. 3 is a diagram illustrating a layout of the printing head substrate 101 in the present embodiment. The PAD 202 is provided at a substrate end portion in the printing head substrate 101, and the PAD 202 includes the signal terminal that receives ejection orifice selection data, the power supply terminal, and the like. A liquid supply port 306 to supply liquid (ink) to be ejected is provided in a central portion of the printing head substrate 101, and the liquid is supplied to an upper layer of a heater 303, which is a printing element. An ejection orifice is arranged immediately above the heater 303. A current flows to the heater 303 in an arbitrary timing to generate a bubble by heating the liquid, and a liquid droplet and the like are ejected from the ejection orifice. Note that, although the heater 303 is described as an example of the printing element in the present embodiment, a configuration in which the liquid is mechanically ejected by using a piezo element or the like as the printing element may be applied. A sub heater 305 is a heating element that heats or keeps warm the printing head substrate 101 and the liquid. A sub heater driver 308 is connected to the sub heater 305 and turns on or off a current flowing to the sub heater 305.

Figure 4:
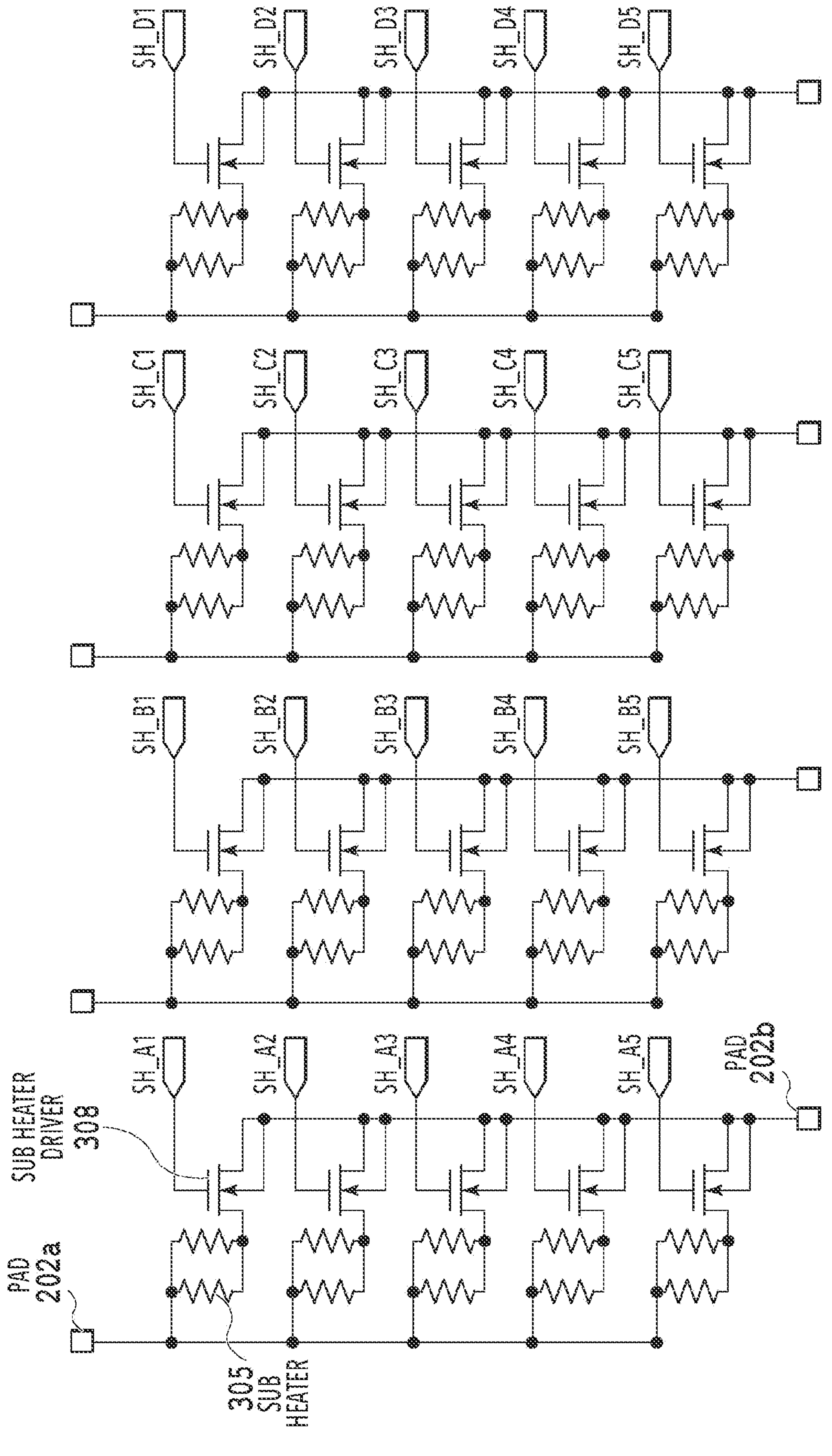
FIG. 4 is a driving circuit diagram of a sub heater.

FIG. 4 is a circuit diagram of driving of the sub heater 305 corresponding to FIG. 3. A PAD 202*a* is a positive power supply PAD, and a PAD 202*b* is a GND PAD. The PAD 202*a* and the PAD 202*b* may be used also as a power supply of the heater 303 used for the liquid droplet ejection. There are sub heater drivers 308 provided in 20 portions in an entire region of the printing head substrate 101, which are controlled by sub heater control signals SH_A1 to SH_D5 to heat a partial region of the printing head substrate 101 (hereinafter, referred to as a "heated area 307"). That is, one sub heater driver 308 is arranged in one heated area 307, respectively. Additionally, in a case of controlling the temperature of the entire printing head substrate 101 more accurately, more than 20 heated areas 307 may be provided. The liquid supply ports 306 are arranged in a predetermined direction on each of two sides of the heater arrays. In addition, the sub heater driver 308 is arranged on an outer side of the liquid supply port 306. The sub heater control signals SH_A1 to SH_D5 may be directly supplied from the PAD 202 or may be generated by being converted from a data signal in the printing head substrate 101.

Figure 5:
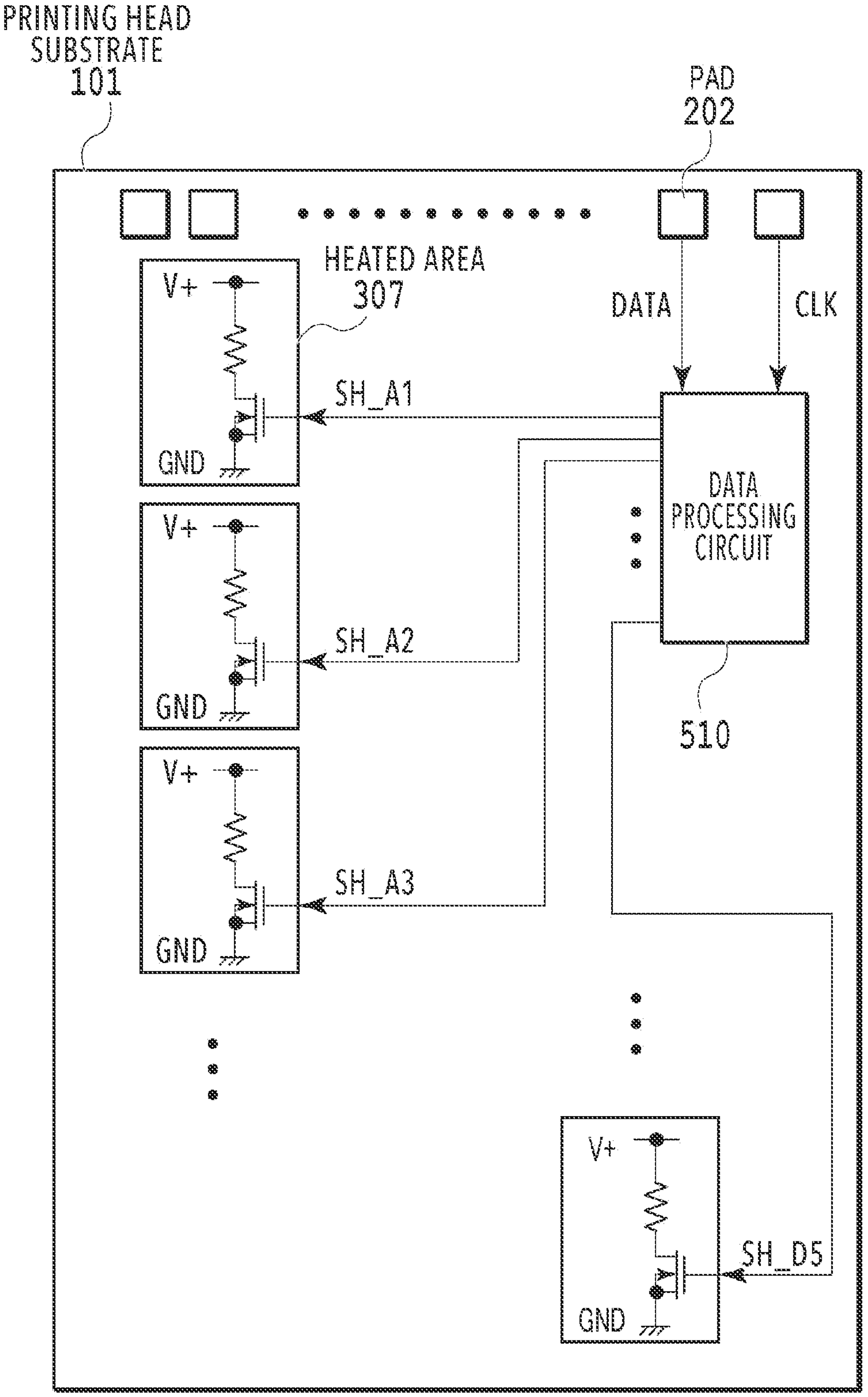
FIG. 5 is a block diagram in a case where a sub heater control signal is generated in the printing head substrate.
Figure 6:
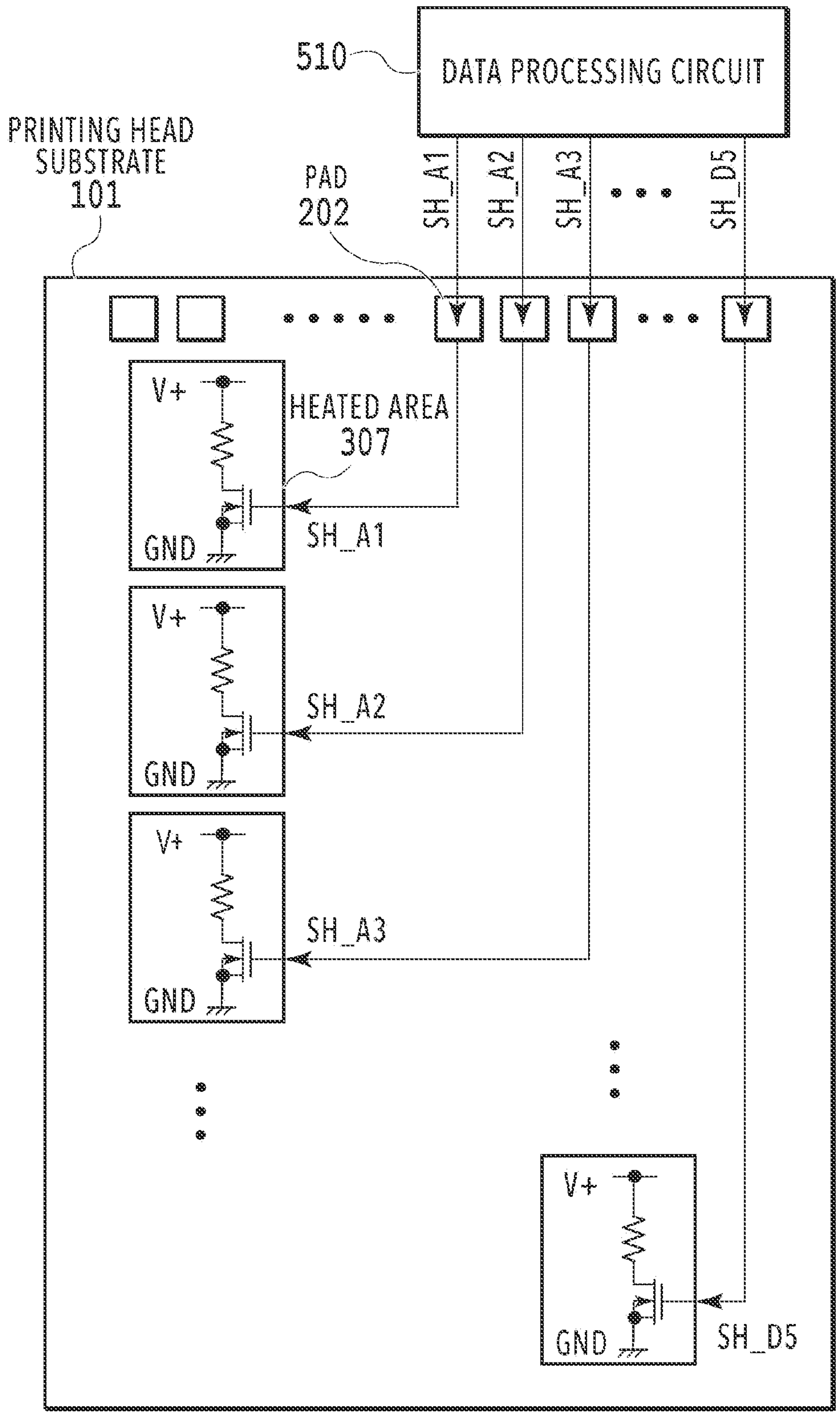
FIG. 6 is a block diagram in a case where the sub heater control signal is supplied from outside of the printing head substrate.

FIG. 5 is a block diagram in a case where the sub heater control signals are generated in the printing head substrate 101. FIG. 6 is a block diagram in a case where the sub heater control signals are directly supplied from the outside of the printing head substrate 101. In a case of employing the method in FIG. 5, it is possible to control the sub heater 305 without increasing the PAD 202 by transmitting control signal data to a data processing circuit (switch circuit) 510 with image data. In FIG. 3, plural sub heaters 305 are arranged in a row in a long side direction of the printing head substrate 101, and the sub heaters 305 are arranged between the liquid supply ports 306 and the heaters 303. With this arrangement, the liquid near each heater 303 is heated, and thus it is possible to heat and eject the liquid more efficiently. Basically, the sub heaters 305 in the plural heated areas 307 in the printing head substrate 101 are all in the same layout. In a case of changing a heat generation amount of the sub heater 305 for each heated area 307, it is possible by adjusting the layout of the sub heaters 305. Thus, the heat generation amount by the sub heater 305 in each heated area 307 is all equal, and it is possible to control a temperature distribution in the printing head substrate 101 to be uniform.

Figures 7A, 7B, 7C, 7D:
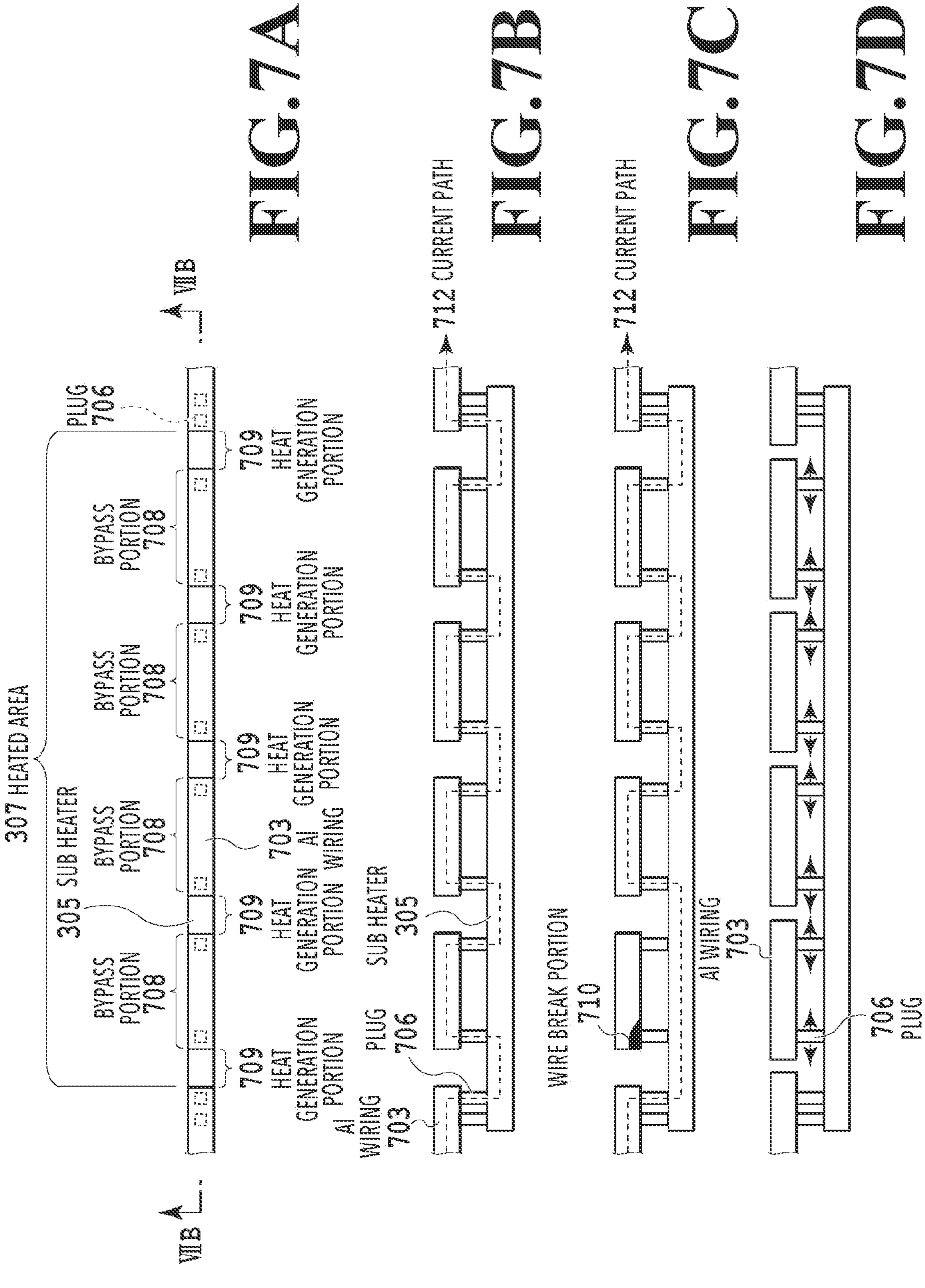
FIGS. 7A, 7B, 7C, and 7D are diagrams each illustrating a layout of the sub heater.

FIG. 7A is a layout diagram of the sub heater 305 in the present embodiment. FIGS. 7B, 7C, and 7D are cross-sectional views taken along a VIIB-VIIB line in FIG. 7A. In this case, Poly-Si (polysilicon) is used as an example of material of the sub heater 305. In FIG. 7A, five heat generation portions 709 and four bypass portions 708 are arranged in the heated area 307. Bypass wiring 304 includes Al wiring 703 and a plug 706, and a resistance value of the bypass wiring 304 is sufficiently small to be 1/100 to 1/1000 of a resistance of the sub heater 305, which is estimated to be 0 [Ω] herein.

In the configuration of the present embodiment, the heat generation portions 709 are arranged dispersedly in the heated area 307. The bypass portions 708 are each formed of metal, and thus a thermal resistance of the bypass portion 708 is low. Additionally, since the bypass portion 708 is sandwiched between the heat generation portions 709, the heat generated by the heat generation portion 709 is diffused to the bypass portion 708, and the heated area 307 is heated uniformly. In a case of heating more uniformly, it is preferable to reduce a length of the bypass portion 708 and to expand each heat generation portion 709 while maintaining a ratio between a length and a width of the heat generation portion 709. In this case, the area of the sub heater 305 is increased. On the other hand, a shrink effect is obtained by reducing the length and the width of the heat generation portion 709 and increasing the length of the bypass portion 708. However, since this increases a wiring current density, there is a possibility that wire break due to electromigration and the like occurs.

FIG. 7C is a diagram illustrating an example of the wire break occurs due to the electromigration. Since currents concentrate in the plug 706, the electromigration is likely to occur in a contact portion with the Al wiring 703 comparatively. Usually, a design with a current range that does not cause such a wire break defect is applied. In addition, a countermeasure such as sandwiching barrier metal between the Al wiring 703 and the plug 706 is adopted. In the present embodiment, since the sub heater 305 is wired over a range of the heated area 307, even in a case where the wire break occurs in the Al wiring 703, the current detours the sub heater 305, and a sub heating function is secured. With the employment of such a wiring method, high reliability for the sub heating driving is obtained. However, since the resistance is increased in the wire break, the heat generation amount is reduced. For this reason, in a case of the wire break, it is better to reduce the driving of the sub heater in the area as much as possible.

As indicated by a current path 712, since the resistance of the sub heater 305 is high, the current flows through the Al wiring 703 of a low resistance. As described above, even in a case where the wire break occurs in the plug 706 in each of the four bypass portions 708 in FIG. 7A, the current flows to the sub heater 305; therefore, the sub heating function is secured. However, in a case where the wire break occurs in a powering port at each of two ends of the sub heater 305, a circuit of the sub heater 305 is opened, and the sub heating function is lost. To deal with this phenomenon, as illustrated in FIG. 7B, two or more plugs 706 may be provided in the powering port at each of the two ends of the sub heater 305. Even if the wire break occurs in the powering port in one of the plugs 706 at each of the two ends of the sub heater 305, the current flows to the other plug 706; therefore, it is possible to suppress the open state of the circuit of the sub heater 305 and to maintain the sub heating function.

FIG. 7D is a diagram illustrating an example in which an Al wiring length is longer than that in FIG. 7B. With such a design, it is possible to widely adjust the heat generation amount only by changing a position of the plug. With the plug 706 arranged on an outer side of the Al wiring 703, a length of the heat generation portion is reduced, and the resistance is reduced; thus, it is possible to make the adjustment to increase the heat generation amount. On the other hand, with the plug 706 moved to an inner side of the Al wiring 703, the resistance value is increased; thus, it is possible to make the adjustment to reduce the heat generation amount. In other words, it is possible to adjust the heat generation amount without changing the sub heater 305 or the Al wiring 703. Since it is possible to set the heat generation amount to a proper value by changing the design of only a piece of mask for the plug, it is possible to reduce the cost of the printing head substrate 101 in a case of changing the design of the heat generation amount of the sub heater.

The electromigration is described with reference to FIGS. 7A to 7D. In the present embodiment, the current also flows for a long time in the Al wiring 703 connecting the sub heater driver 308 and the sub heater 305 with each other. Thus, a margin for the electromigration is increased.

Figure 8:
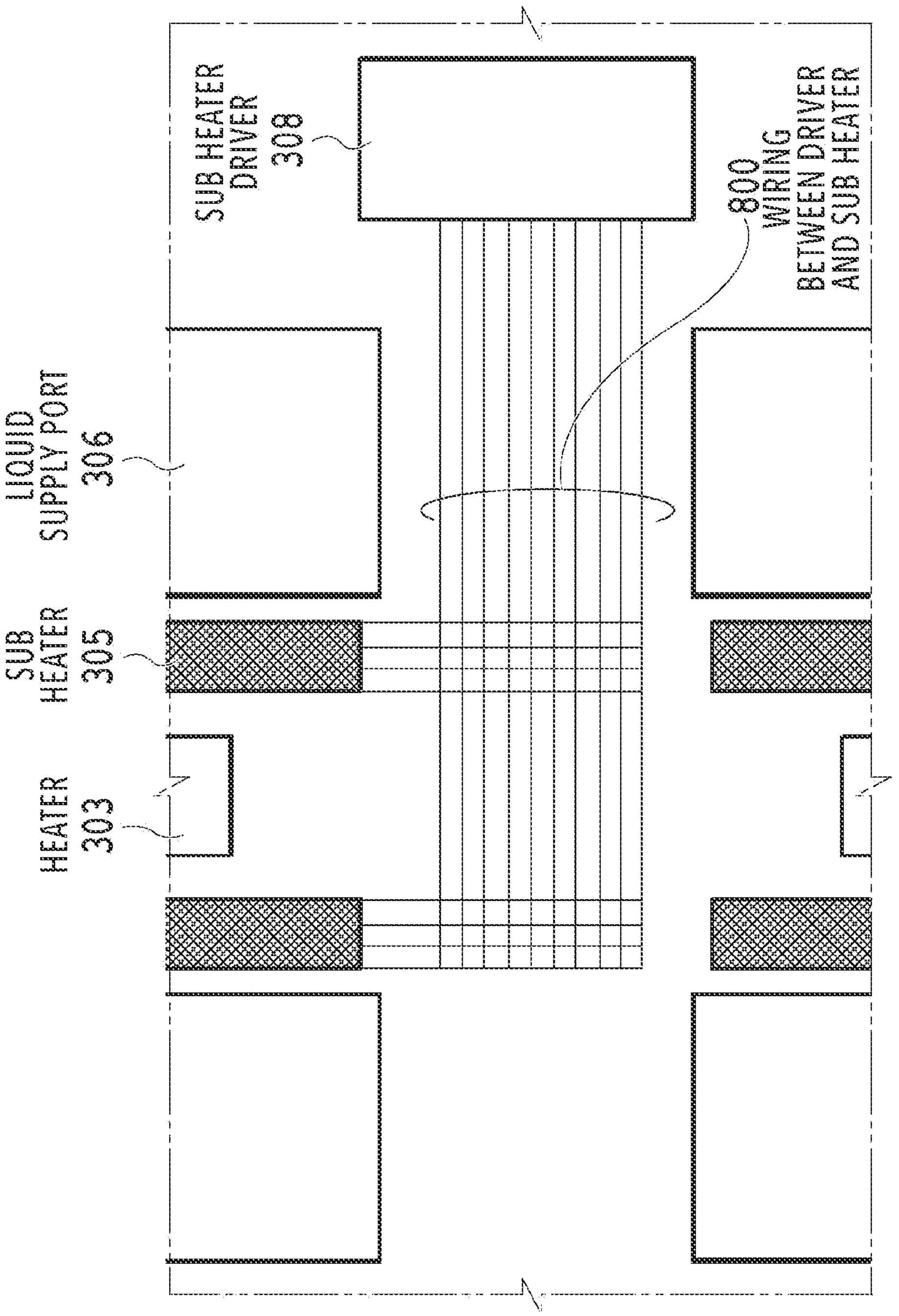
FIG. 8 is a diagram illustrating the vicinity of a sub heater driver and divided wiring.

FIG. 8 is an enlarged view of a region VIII near the sub heater driver 308 in FIG. 3. In FIG. 8, wiring that is divided into plural pieces of wiring is used as wiring that connects the sub heater driver 308 and one end portion of the sub heater 305. Hereinafter, each of the pieces of divided wiring is referred to as “divided wiring”. The divided wiring from the sub heater driver 308 to the sub heater 305 that is illustrated in FIG. 8 is merely an example, and the number of the pieces of divided wiring may be any number as long as it is plural. Additionally, the wiring from the sub heater driver 308 and the wiring to the sub heater 305 are electrically connected to each other at a crossing portion. In a case where the sub heater driver 308 is turned on, the same voltages are applied to the pieces of the divided wiring from all the sub heater drivers 308, and voltages supplied to the pieces of the divided wiring to the sub heater 305 are also the same. Additionally, plural pieces of divided wiring are used also in the bypass wiring 304. The divided wiring is formed of metal that is any one of Al, Cu, Ag, Au, Pt, W, Ni, Co, and Si and an alloy including any one of Al, Cu, Ag, Au, Pt, W, Ni, Co, and Si.

Figure 9A:
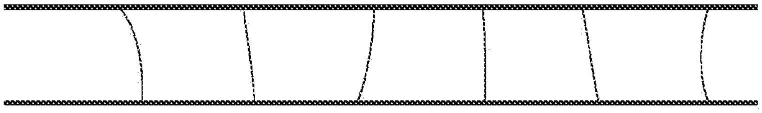
FIGS. 9A and 9B are diagrams illustrating a grain boundary of the divided wiring between the sub heater driver and the sub heater.
Figure 9B:
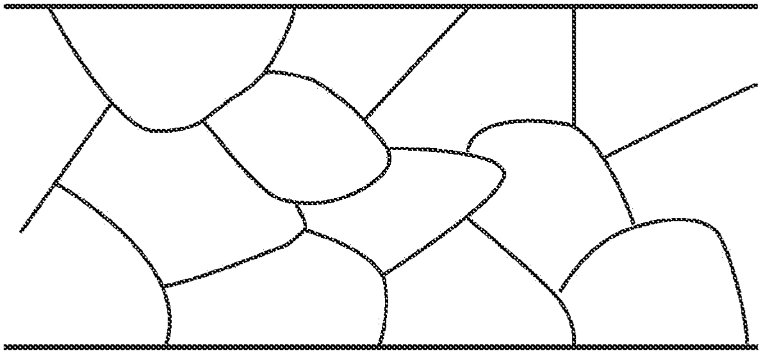

The electromigration relates to a movement of an atom, and the movement of the atom depends on a grain boundary structure of the wiring. In this case, a particle diameter indicates a size of a grain of a crystal in the metal wiring used. The grain boundary indicates an interface between adjacent crystals. FIG. 9A is a diagram illustrating a grain boundary structure (plan view) of the divided wiring of the present embodiment. FIG. 9B is a diagram illustrating a grain boundary structure (plan view) of already-existing wiring. The atom that is pushed out in a case where the current flows to the wiring is moved along the grain boundary. Therefore, in the grain boundary structure of the already-existing wiring illustrated in FIG. 9B, the grain boundary is likely to be formed along a longitudinal direction of a wiring length, and thus it can be seen that it is a configuration in which the electromigration is likely to occur. On the other hand, in the divided wiring illustrated in FIG. 9A, the grain boundary is formed such that the boundaries face each other in the longitudinal direction of the wiring length; therefore, the atom is unlikely to be moved. In other words, in a case as illustrated in FIG. 9A, it is possible to suppress an effect of the electromigration. Accordingly, a configuration in which a wiring width of the wiring between the driver and the sub heater is equal to or smaller than a particle diameter of the material forming the divided wiring is desirable. Alternatively, the wiring width of the wiring between the driver and the sub heater may be equal to or smaller than an average particle diameter of the material forming the divided wiring. The particle diameter of the material forming the divided wiring of the present embodiment is assumed to be 0.5 [μm] to 2 [μm]; therefore, the wiring width of the divided wiring is 0.5 [μm]. However, taking into consideration variability in the particle diameter of the material forming the divided wiring and patterning of the wiring, there is also a possibility that there is the particle diameter smaller than 0.5 [μm]. In this case, as illustrated in FIG. 9A, it is unnecessary to form the grain boundary such that the boundaries face each other in the longitudinal direction of the wiring length in all the portions in the wiring between the driver and the sub heater. It is possible to achieve an effect to suppress the movement of the atom in a case where the grain boundary illustrated in FIG. 9A is formed in at least one portion. Additionally, it is desirable for a slit between the pieces of wiring between the driver and the sub heater is as small as possible to reduce the current density. In the present embodiment, the slit is 0.4 [μm].

Figures 10A, 10B, 10C:
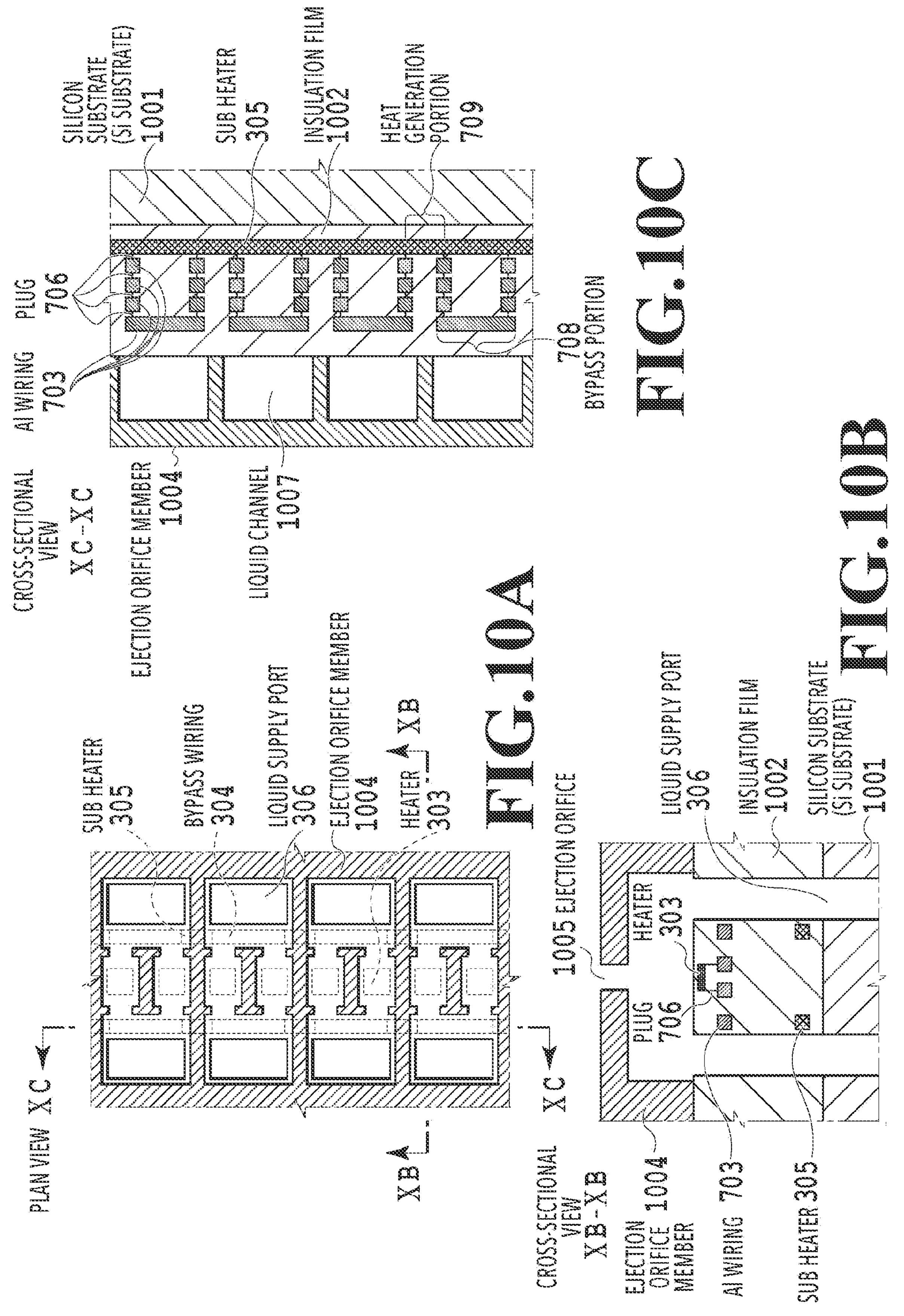
FIGS. 10A, 10B, and 10C are diagrams each illustrating a detailed configuration of the vicinity of a heater.

FIG. 10A is an enlarged plan view of the vicinity of the heater 303 in the printing head substrate 101 illustrated in FIG. 3. Description of the sub heater driver 308 is omitted. In a configuration as illustrated in the plan view in FIG. 10A, a liquid channel 1007 is designed by an ejection orifice member 1004 for the heater 303 and the liquid supply port 306, and one liquid supply port 306 is provided on each of two sides of the two heaters 303. With such a configuration, the liquid is refilled from the liquid supply ports 306 on the two sides after the liquid ejection; therefore, it is a configuration that can increase an ejection frequency and can increase the printing throughput significantly. In the configuration of the present embodiment, it is possible to reduce the sub heater width without reducing the heat generation amount as described above; therefore, the ejection frequency is not affected even in a case where the sub heater 305 is arranged between the heater 303 and the liquid supply port 306.

FIG. 10B is a cross-sectional view taken along a XB-XB line in FIG. 10A and is a diagram of a cross-section of the heater 303 in a liquid channel direction. FIG. 10C is a cross-sectional view taken along a XC-XC line in FIG. 10A and is a diagram of a cross-section of the sub heater 305 in the longitudinal direction. As illustrated in FIG. 10C, the sub heater 305 includes the bypass portion 708 and the heat generation portion 709. The sub heater 305 is Poly-Si wiring (polysilicon wiring). In a space including a silicon substrate (Si substrate) 1001 as a substrate and the ejection orifice member 1004 forming an ejection orifice 1005, the sub heater 305 is arranged on a silicon substrate side. The Al wiring 703 includes four layers, and a heater layer is laminated on the Al wiring 703. Additionally, the pieces of wiring of the layers are connected through the plugs 706 and covered with an insulation film 1002. The ejection orifice member is laminated on a layer on the heater layer, and the liquid channel 1007 and the ejection orifice 1005 are arranged.

As illustrated in FIG. 10B, the sub heater 305 is away from the heater 303 ejecting the liquid. As a position heated by the sub heating, near the heater 303 close to the ejection of the liquid is ideal. In the present embodiment, a configuration in which the bypass portion 708 is provided next to the heater 303 to form a bypass using the Al wiring 703 in the upper layer closer to the heater 303 to transfer the heat from the heat generation portion 709 more to the vicinity of the heater is employed. With the employment of the configuration, it is possible to perform heating by the sub heating in a portion closer to the ejected liquid, and it is possible to implement a reduction in the viscosity of the liquid by heating the liquid. This liquid heating is performed by heating a substrate on the sub heater by the sub heater and transferring the heat of the heated substrate to the liquid. Thus, it is possible to speed up the refilling of the liquid and to improve the printing throughput. Additionally, with this configuration, it is possible to eject liquid having a higher viscosity. Thus, it is possible to achieve a high image quality, the degree of freedom in selecting the liquid is increased, and it is possible to use the printing apparatus for various purposes.

Figure 11A:
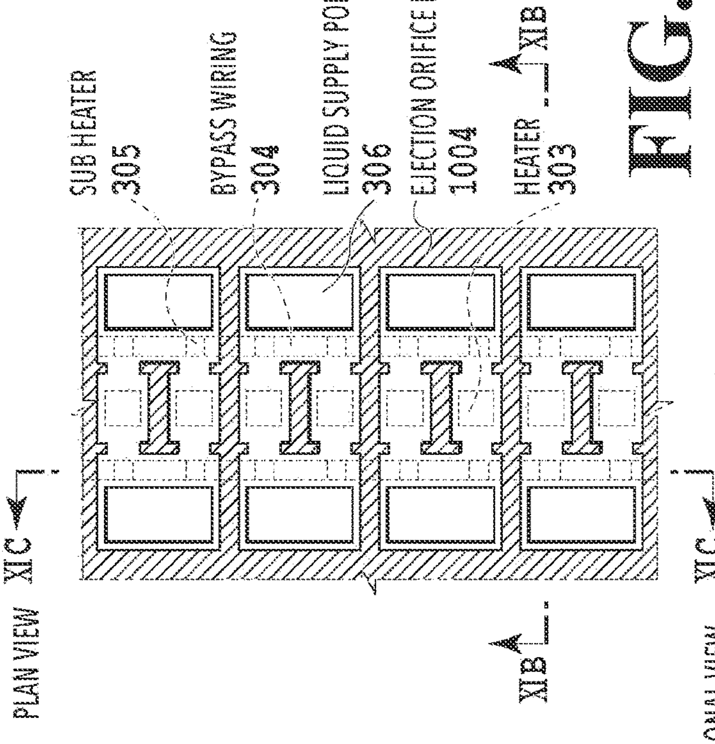
FIGS. 11A, 11B, and 11C are diagrams each illustrating a detailed configuration of the vicinity of the heater.
Figure 11B:
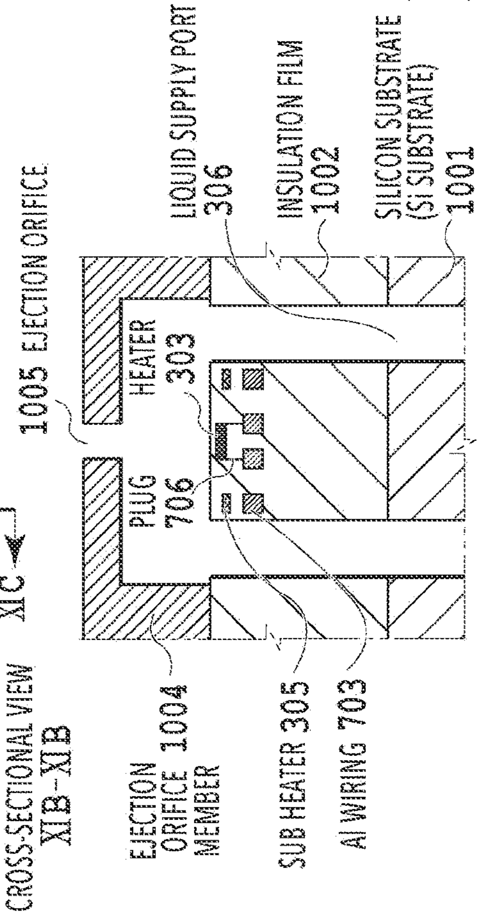
Figure 11C:
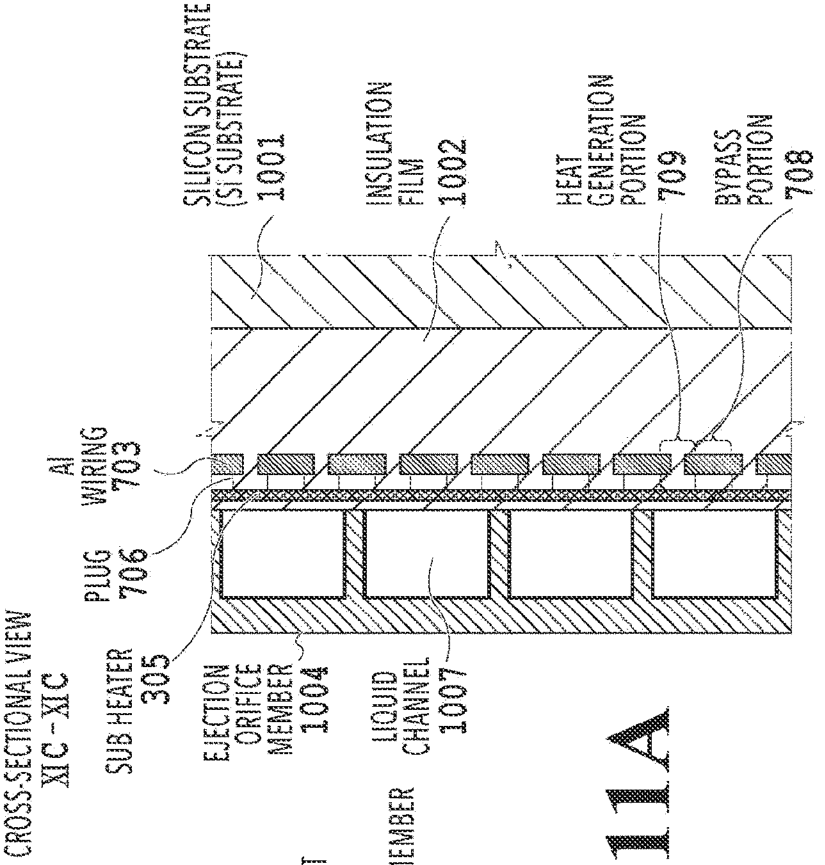

FIG. 11A is a plan view in a case where Poly-Si (polysilicon) is not used as the sub heater material but a film that is the same as that of the heater 303 is used. FIG. 11B is a cross-sectional view taken along a XIB-XIB line in FIG. 11A. FIG. 11C is a cross-sectional view taken along a XIC-XIC line in FIG. 11A. An example of the material of the heater 303 may be TaSiN. In general, the resistance of the heater 303 for the liquid ejection has a higher resistance value than that of Poly-Si. The heat generation amount emitted by the sub heater 305 is determined by V*V/R. In order to obtain the heat generation amount similar to that in a case in FIG. 10, the length of the sub heater 305 needs to be short. Accordingly, as illustrated in FIG. 11C, the number of the disposed bypass portions 708 in FIG. 11C is greater than that of the bypass portions 708 in FIG. 10C. As illustrated in FIG. 11C, the sub heater 305 is arranged on an ejection orifice member side in the space including the silicon substrate 1001 and the ejection orifice member 1004. Comparing with the configuration illustrated in FIG. 10B, the configuration illustrated in FIG. 11B is a configuration in which the sub heater 305 is closer to the heater 303; therefore, it is a configuration in which the heat generation portion 709 of the sub heater 305 is arranged near the heater 303. Accordingly, in the configuration illustrated in FIG. 11B, the liquid is heated closer to the ejection orifice 1005 than the configuration illustrated in FIG. 10B; therefore, it is possible to speed up the refilling of the liquid more and to improve the printing throughput more.

As mentioned above, according to the configuration of the present embodiment, it is possible to suppress occurrence of the electromigration in the printing head substrate 101. With use of the printing head substrate of the present embodiment, it is also possible to speed up the refilling of the liquid and to improve the printing throughput.

Second Embodiment

Figure 12A:
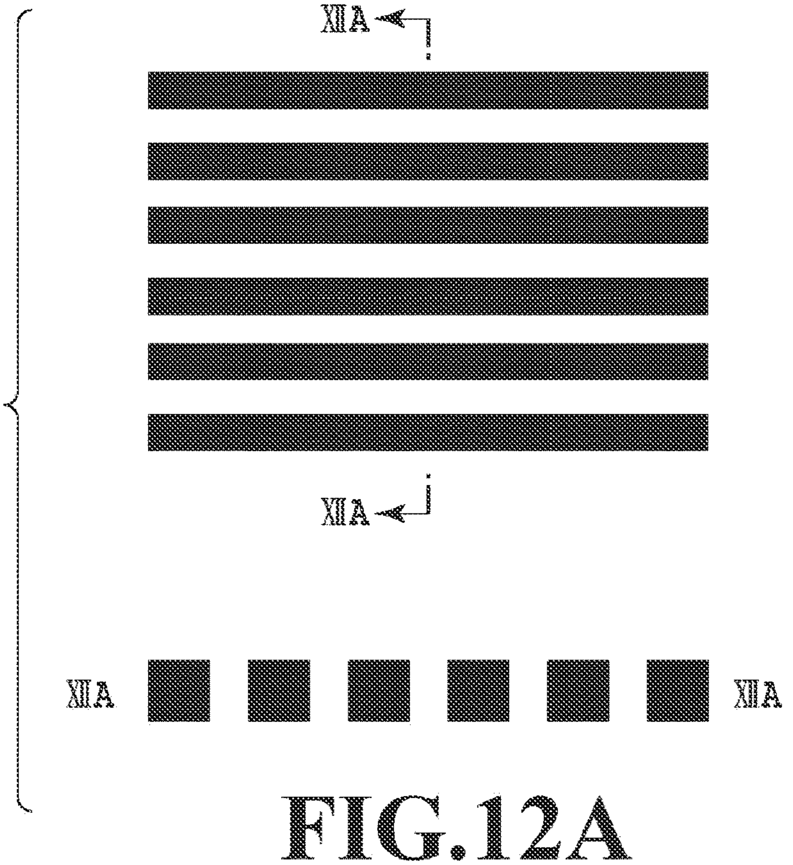
FIGS. 12A and 12B are diagrams each illustrating an example of a layout of wiring.
Figure 12B:
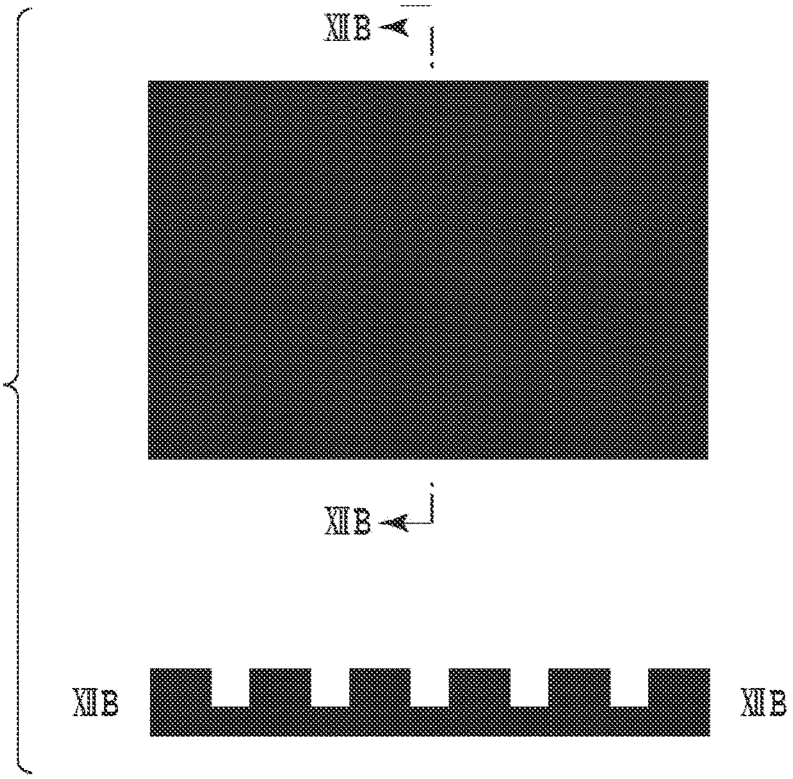

FIG. 12B illustrates a wiring layout of a second embodiment. FIG. 12A illustrates a layout of the plural pieces of divided wiring connecting the sub heater driver 308 and the sub heater 305 with each other in the first embodiment. As illustrated in a cross-sectional view taken along a XIIB-XIIB line in FIG. 12B, in the present embodiment, a configuration in which a slit is formed and no plural pieces of divided wiring are formed is employed. As illustrated in the cross-sectional view taken along the XIIB-XIIB line in FIG. 12B, the wiring forms a protrusion portion and a recess portion. The wiring illustrated in FIG. 12B is used in the wiring between the sub heater driver 308 and the sub heater 305 and the bypass wiring 304. A height of the protrusion portion and the recess portion with respect to the XIIB-XIIB line and a width of the recess portion are adjusted to be equal to or smaller than the particle diameter or the average particle diameter of the material forming the wiring including the protrusion portion and the recess portion. Thus, it is possible to increase the margin for the electromigration than the already-existing wiring layout.

Third Embodiment

Figure 13A:
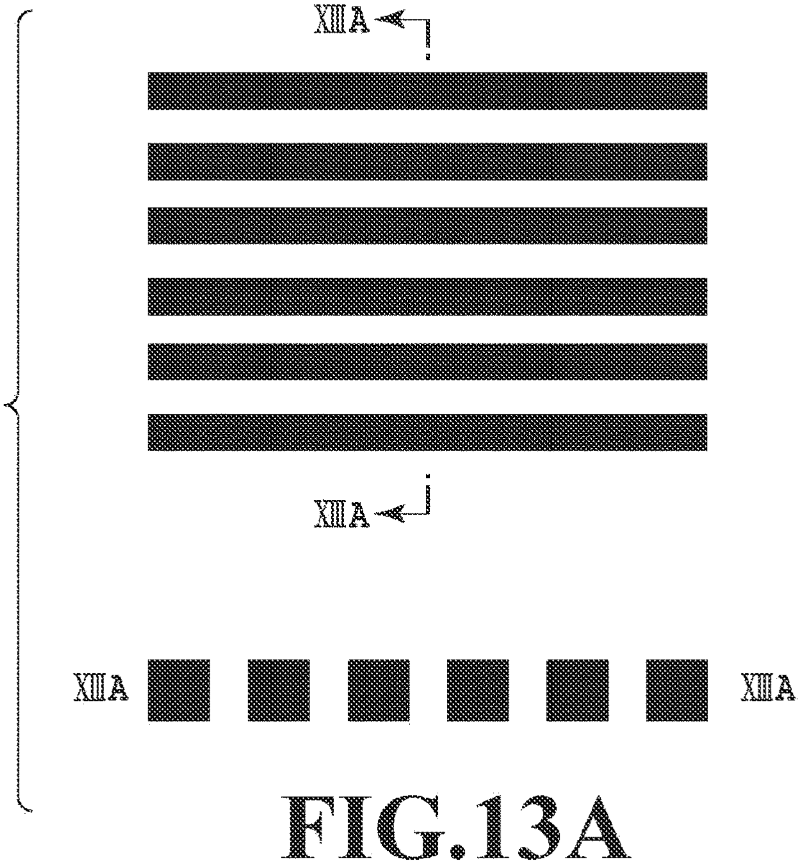
FIGS. 13A and 13B are diagrams each illustrating an example of the layout of the wiring.
Figure 13B:
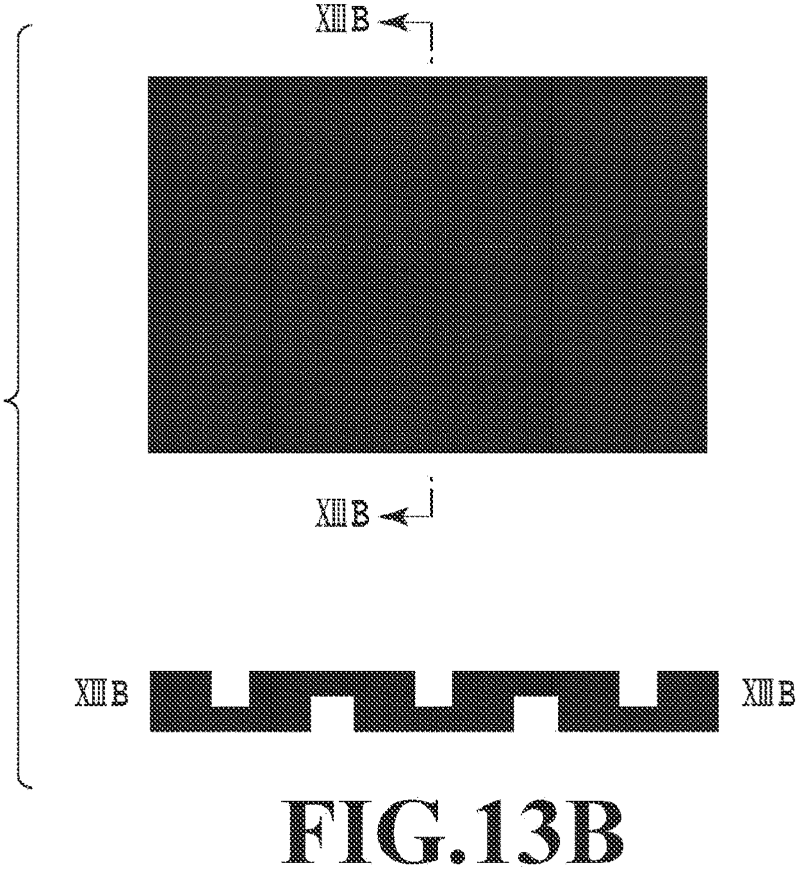

FIG. 13B illustrates a wiring layout of a third embodiment. FIG. 13A illustrates the layout of the plural pieces of divided wiring connecting the sub heater driver 308 and the sub heater 305 with each other in the first embodiment. As illustrated in a cross-sectional view taken along a XIIIB-XIIIB line in FIG. 13B, in the present embodiment, a configuration in which a slit is formed and no plural pieces of divided wiring are formed is employed. As illustrated in the cross-sectional view taken along the XIIIB-XIIIB line in FIG. 13B, a cross-section of the wiring layout in the present embodiment has a snake shape. The wiring illustrated in FIG. 13B is used in the wiring between the sub heater driver 308 and the sub heater 305 and the bypass wiring 304. In the snake shape portion, a height of the protrusion portion and the recess portion with respect to the XIIIB-XIIIB line and a width of the recess portion are adjusted to be equal to or smaller than the particle diameter or the average particle diameter of the material forming the wiring including the protrusion portion and the recess portion. Thus, it is possible to increase the margin for the electromigration than that of the already-existing wiring layout.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-077139, filed May 9, 2023, which is hereby incorporated by reference wherein in its entirety.

What is claimed is:

1. A printing head substrate, comprising:

a heating element configured to control a temperature of the printing head substrate that ejects liquid supplied from a liquid supply port from an ejection orifice; and a driver configured to drive the heating element, wherein an electrical connection between the heating element and the driver is made by wiring that is divided into plural pieces of wiring, wherein the wiring from the driver and the wiring to the heating element are electrically connected to each other at a crossing portion, and wherein a wiring width of the wiring between the driver and the heating element is equal to or smaller than a particle diameter of a material forming the wiring.

2. The printing head substrate according to claim 1, wherein the printing head substrate includes the plural heating elements, and the driver is connected to the plural heating elements.

3. The printing head substrate according to claim 1, wherein the heating element controls a temperature of a partial region of the printing head substrate.

4. The printing head substrate according to claim 1, further comprising:

plural printing elements configured to eject the liquid from the ejection orifice.

5. The printing head substrate according to claim 4, wherein the heating element is made of the same material as material of the plural printing elements.

6. The printing head substrate according to claim 5, wherein in a space including a silicon substrate as a substrate and an ejection orifice member forming the ejection orifice, the heating element is arranged on a side of the ejection orifice member.

7. The printing head substrate according to claim 1, wherein the ejection orifice and the liquid supply port are arranged in a predetermined direction, and the heating element is arranged between an array of the ejection orifice and an array of the liquid supply port.

8. The printing head substrate according to claim 1, wherein the heating element is made of polysilicon.

9. The printing head substrate according to claim 8, wherein in a space including a silicon substrate as a substrate and an ejection orifice member forming the ejection orifice, the heating element is laminated on a side of the silicon substrate.

10. The printing head substrate according to claim 1, wherein the plural pieces of wiring is metal that is made of any one of Al, Cu, Ag, Au, Pt, W, Ni, Co, and Si or an alloy including any one of Al, Cu, Ag, Au, Pt, W, Ni, Co, and Si.

* * * * *